United States Patent [19]
Zievers

[11] 4,238,329
[45] Dec. 9, 1980

[54] PROCESS FOR RECOVERING HEAVY METAL USING INSOLUBLE STARCH-XANTHATES

[75] Inventor: James F. Zievers, LaGrange, Ill.

[73] Assignee: Industrial Filter Corporation, Cicero, Ill.

[21] Appl. No.: 75,587

[22] Filed: Sep. 14, 1979

Related U.S. Application Data

[63] Continuation-in-part of Ser. No. 925,056, Jul. 17, 1978, abandoned, which is a continuation of Ser. No. 607,549, Aug. 25, 1975, abandoned.

[51] Int. Cl.$^3$ ............................................. B01D 15/04
[52] U.S. Cl. ...................................... 210/36; 210/38; 210/688; 210/714; 210/778
[58] Field of Search .................. 210/38 B, 54, 58, 59, 210/75, 502, 193, 36, 46, 51–53

[56] References Cited

U.S. PATENT DOCUMENTS

| 3,250,703 | 5/1966 | Levendusky | 210/75 |
| 3,947,354 | 3/1976 | Swanson et al. | 210/54 R |
| 3,979,286 | 9/1976 | Wing et al. | 210/38 B |
| 4,007,301 | 2/1977 | De Martino | 210/75 |
| 4,051,316 | 9/1977 | Wing et al. | 210/54 R |

FOREIGN PATENT DOCUMENTS 46-39544  11/1971  Japan ..................................... 210/54 R Primary Examiner—Benoit Castel
Attorney, Agent, or Firm—Edmond T. Patnaude

[57] ABSTRACT

A precoat layer comprising a mixture of insoluble starch-xanthate and a filter-aid is deposited on a filter leaf through which a solution containing a heavy metal flows in a continuous stream and insoluble starch-xanthate and filter-aid are continuously added upstream of the precoat layer.

5 Claims, No Drawings

PROCESS FOR RECOVERING HEAVY METAL USING INSOLUBLE STARCH-XANTHATES

This application is a continuation-in-part of my application Ser. No. 925,056 filed July 17, 1978, which in turn is a continuation of my earlier application Ser. No. 607,549 filed Aug. 25, 1975, both now abandoned.

The present invention relates in general to the art of reacting insoluble starch-xanthates with heavy metal ions in an aqueous solution to recover the heavy metal, and it relates in particular to a new and improved process wherein insoluble starch-xanthate and filter-aid are continuously added to a continuously flowing stream of water containing heavy metal ions upstream of a filter which is coated with a mixture of insoluble stach-xanthate and filter-aid.

BACKGROUND OF THE INVENTION

In the treatment of water to purify it for discharge into sewage systems, streams and the like, it is necessary or desirable to remove contaminants even when the contaminants are contained in very small concentrations such as a few hundred parts per million or less. In many situations industrial waste waters may contain small quantities of heavy metals such as copper, iron, lead, zinc, nickel, silver or gold with the concentration thereof varying from time to time over a substantial range. For example, the concentration of copper in an aqueous bath exiting a chrome plating system may vary from ten parts per million to thirty parts per million. Since, however, the concentration will peak at thirty parts per million only for brief periods, the prior art metal removal processes have not performed in an efficient manner when designed to function at the maximum concentration levels. Nevertheless, it is important that whatever process is used does not permit the heavy metals to be discharged even during the brief periods of maximum concentration.

It is known in the prior art that heavy metals can be precipitated out of aqueous solutions by placing the solution in a settling tank and adding insoluble starch-xanthate (ISX) to the solution. The ISX reacts with the heavy metal ions in solution to cause the heavy metals and the ISX to co-precipitate out of solution. The ISX may be prepared in any suitable manner such as by any of the methods described in U.S. Pat. Nos. 3,979,286 and 4,051,316. Japanese patent 46-39544 describes such a heavy metal removal process wherein the aqueous solution is treated with ISX. A prime disadvantage of the prior art processes of this type has been the need for holding tanks, settling basins or the like.

In my copending application, Ser. No. 961,238 filed Nov. 16, 1978, now abandoned there is disclosed a heavy metal removal process wherein a mixture of ISX and a filter-aid, such as diatomaceous earth, is coated on a filter element to form a filter cake through which the aqueous solution containing the heavy metals is passed. As the solution flows through the cake the heavy metal ions become attached to the active sites on the starch-xanthate and are thus removed from the solution. This process is better than the other prior art metal removal processes using ISX in that it may be used with a continuously flowing stream since no holding tanks, settling basins or the like are required. However, where the concentration of heavy metals varies, the amount of ISX deposited on the filter elements must be sufficient to react with all of the metal contained in the solution during the periods of maximum concentration. Consequently, this process necessitates the use of a greater amount of ISX than is required with the batch type processes of the prior art which operate on the average concentration of heavy metals in the solution being treated.

It is also known in the prior art that reactant material such as ion-exchange resins can be precoated on a filter element so as to react with a liquid solution passed through the resin precoat as the liquid flows through the filter element. U.S. Pat. No. 3,250,704 describes one such system which used a resin precoat in a water purification process.

The precipitation processes known in the prior art and discussed above are not affected by momentary increases in concentration, peaks, as they are called, inasmuch as they are batch processes operating on the average concentration of the batch. However, where the water is purified as it continuously flows through the system as in the process described in my said copending application, it is absolutely necessary that the process functions to remove substantially all of the heavy metal during the peak concentration periods if the minimum discharge requirements are to be met. This can, of course, be achieved by the use of sufficient precoat volume to provide the necessary reaction during peak concentrations, but a considerably greater quantity of the insoluble starch-xanthate and filter-aid and a considerably greater filter area must be used than would be required to remove all of the heavy metal during the average or usual periods of concentration.

SUMMARY OF THE INVENTION

Briefly, there is provided in accordance with the present invention a new and improved process which utilizes insoluble starch-xanthate to remove heavy metals from an aqueous solution by flowing the solution through a filter coated with a mixture of ISX and filter-aid by continuously adding ISX and filter-aid to the aqueous solution upstream of the filter. The amount of ISX added upstream of the filter is at least sufficient to remove all of the heavy metal ions from the solution during periods of minimum concentration but preferably during periods of about average concentration. During those periods when the heavy metal concentration is in excess of the capacity of the amount of ISX being added to the solution to capture all of the heavy metal, some free metal ions flow through the cake of ISX and filter-aid on the filter and are thereby removed from the solution. As will be apparent to those skilled in the art as this description of the invention proceeds, this process results in a substantial savings in the cost of the ISX used to remove a given amount of heavy metal from solution and to subsequently dispose of the spent ISX and filter-aid.

Inasmuch as the ISX in the filter cake functions to remove the heavy metal ions only during the brief periods of peak concentration, the precoat cake may be relatively thick. Also, since the metal removal process occurs primarily while the ISX is freely floating in the solution, the effective capabity of a given amount of ISX to remove heavy metal ions is appreciably greater than would be the case if all the ISX were contained in the filter cake where many of its active sites would be occluded.

The process of the present invention thus enables the removal of heavy metals from a continuous stream of an aqueous solution in an economically efficient manner.

This metal removal process may be carried out on a continuous basis in conjunction with other continuous treating processes.

DETAILED DESCRIPTION OF THE INVENTION

For simplicity of description my process will be described particularly in connection with the removal of copper from a continuously flowing stream of water containing copper in concentrations which vary from about 10 p.p.m. to 30 p.p.m. and which averages about 20 p.p.m. It will be understood by those skilled in the art, however, that the process of the present invention may be used to remove other heavy metals such as zinc, cadmium, lead, chromium, nickel, iron, silver and gold, wither alone or in combination, from aqueous solutions as well as to remove heavy metals contained in the water in other small concentrations.

Insoluble starch-xanthate, or ISX as it is commonly known, and hereinafter referred to, is a crosslinked-starch-xanthate which is insoluble in water and which contains reactive sites for attachment to heavy metal ions. U.S. Pat. Nos. 3,947,534, 3,979,286 and 4,051,316 describe several such insoluble starch-xanthate and methods of manufacturing them. The process of the present invention may be carried out by using any of these particular starch-xanthate, but the invention is not so limited.

The filter used in the process of my invention may be of any suitable type having a pressure tank in which tubular filter elements, pressure leaf filter elements or other precoatable filter elements are mounted, and through which the liquid to be filtered flows. A mixture of insoluble starch-xanthate and filter-aid, such as diatomaceous earth, is initially circulated through the filter to cause a substantially homogeneous mixture of the insoluble starch-xanthate and the filter-aid to be deposited on the filter elements in the form of a porous cake. Thereafter, any subsequent flow of liquid through the filter necessarily flow through the precoat cake. I have found that the precoat cake should preferably have a thickness of at least one centimeter to provide a stable cake which does not crack or shift on the filter element under normal operating conditions. However, cake thicknesses of two and one-half centimeters or more may be used depending on the system parameters such as flow rates and range of heavy metal concentrations.

After the filter elements have been precoated with the mixture of filter-aid and insoluble starch-xanthate the filter is connected on stream so that the water containing the heavy metal continuously flows through the precoat cake. In addition, a mixture of filter-aid and insoluble starch-xanthate is continuously added to the stream of water upstream of the precoat to remove heavy metal ions from the water before they reach the precoat cake. The amount of insoluble starch-xanthate which is thus body fed to the stream of water is at least sufficient to react with all of the heavy metal in the water during periods of minimum concentration. Even greater economies of operation can be achieved by body feeding into the stream an amount of insoluble starch-xanthate sufficient to react with all of the heavy metal contained in the water during periods of average concentration. In this process the body-fed insoluble starch-xanthate forms a complex with the heavy metal ions and thus captures all of the heavy metal ions from the water in the stream except during the brief periods of maximum concentration, and the insoluble starch-xanthate and the attached heavy metal ions together with the filter-aid are deposited over the precoat cake in the form of a porous cake. During the periods of peak concentration some heavy metal ions remain in solution until they enter the precoat layer where they become attached to the exposed active sites of the insoluble starch-xanthate in the precoat layer. In this manner, the water exiting the filter has been purified by the removal of substantially all heavy metal ions from the water irrespective of the substantial variation in the heavy metal concentration.

The efficiency of this process is substantially improved by mixing filter-aid with the insoluble starch-xanthate applied to the filter element to form a precoat. The filter-aid performs two important functions in the precoat cake; one, it increases the porosity of the cake to permit better water flow through the cake, and two, it exposes more active sites on the insoluble starch-xanthate. The latter function thus enables the use of a lesser amount of insoluble starch-xanthate than would otherwise be required. When the filter-aid is not used, many of the active sites on the insoluble starch-xanthate are occluded. Nevertheless, a still greater efficiency of use occurs when the reaction takes place upstream of the filter cake. I believe the reason for this is that no active sites on the insoluble starch-xanthate are occluded while the insoluble starch-xanthate is floating in the water. However, filter-aid should nevertheless be used in the body feed to maintain the filter cake sufficiently porous so that it does not appreciably restrict the flow of water therethrough. It may be seen, therefore, that a more complete use of the insoluble starch-xanthate is achieved when the amount thereof being fed body fed reacts with all of the heavy metal in solution during periods of average concentration since, except during brief periods of maximum concentration, all of the heavy metal ions have reacted with the body-fed insoluble starch-xanthate before reaching the filter cake. During periods of minimum concentration, some unspent insoluble starch-xanthate is, of course, deposited on the filter cake, but being interspersed with the filter-aid it is available for complexing with heavy metal ions during subsequent periods of maximum concentration.

I have found that the prefilt cake should preferably contain a filter-aid such as diatomaceous earth. The ratio of diatomaceous earth to ISX should be in the range of 1.75 to 3.0 but preferably between 1.75 and 2.0. I have also found that filter-aid should be added along with the ISX upstream of the filter in this same proportion.

When calculating the optimum rate at which the ISX should be fed into the stream and the optimum amount of ISX to be coated on the filter, it will be desirable in some cases to take into account the durations of the minimum and peak concentrations. For convenience, however, calculations based on the average concentration will give results which are superior to simply body feeding the requisite amount of ISX to remove all of the heavy metal at all times or to use only a filter cake containing the requisite amount of ISX to remove all of the heavy metal at all times.

If all of the requisite insoluble starch-xanthate were deposited as a precoat cake or if lesser amounts thereof were periodically added to the stream to form successive active layers of filter cake for reacting with the heavy metal in solution, a greater amount of the insoluble starch-xanthate would be required because of the fact that some of the active sites will necessarily be occluded within the cake. I have found that the capacity of the insoluble starch-xanthate to remove heavy metals from an aqueous solution is about fifteen to twenty percent greater when the starch-xanthate particles are suspended in the aqueous solution being treated as compared to the particles being mixed with filter-aid at a ratio of one part insoluble starch-xanthate to two parts filter-aid and deposited as a filter cake through which solution flows. The capacity of the precoat to remove heavy metals is much lower if the filter-aid is not used.

When the filter cake is formed by a mixture of over three parts filter-aid to one part insoluble starch-xanthate, the effective capacity of the insoluble starch-xanthate to remove heavy metals from solution is also lower, and the use of the extra amount of filter-aid is uneconomical.

The following examples are intended to supplement the disclosure of the invention and are not to be construed as limiting the scope of the invention as defined by the appended claims.

EXAMPLE 1

The following test was conducted to determine the relative amounts of ISX and filter-aid to be contained in the precoat layer for most efficient operation.

Mixtures of one part ISX to one and one-half parts diatomite (diatomaceous earth) were deposited on a one-half square foot filter and found to provide unstable cakes which cracked after a short time of use. While it might be possible to deposit a layer of filter-aid over or under the precoat to avoid the problems associated with cake cracking, it was found that a mixture of 1.75 parts of diatomite to one part ISX provided a stable, satisfactory cake. Tests of Mixtures of two parts diatomite to one part ISX and three parts diatomite to one part ISX also provided stable, satisfactory cakes. However, as the ratio of diatomite to ISX is increased the problem of cake disposal also increases. Consequently, it appears that mixtures in the range of 1.75 to two parts filter-aid to one part ISX are preferable.

EXAMPLE 2

This test was conducted to determine the results achieved by using washed and unwashed ISX in the process of the present invention. Washed ISX was deposited on a bench filter while the flow rate through the filter was monitored. It was found that the flow rate was reduced by about eight percent when the cake thickness was one inch. Repeating the same test with unwashed ISX resulted in a reduction in flow rate of twenty-eight percent. However, tests using washed and unwashed ISX mixed with diatomite in the ratio of one part ISX to two parts diatomite, showed no significant difference in flow rates between washed and unwashed ISX. It therefore appears preferable to use unwashed ISX in carrying out the process of the present invention because the washing step can be eliminated.

EXAMPLE 3

The capacity or effectiveness of the ISX to remove heavy metals from solution when used in a precoat as compared to adding the ISX to the solution was determined in the following manner.

One gram of ISX was added to 930 milileters of an aqueous solution having a concentration of copper ions of 142 parts per million and the amount of copper remaining in solution about one minute thereafter was measured and found to be 24 parts per million. When the same amount of ISX mixed with diatomite was deposited as a one-inch thick precoat on a bench filter and 930 milileters of the same aqueous solution was passed through the precoat, it was found that the capacity of the ISX to remove copper was about fifteen to twenty percent less, i.e., the copper concentration in the effluent reached 24 parts per million when between 745 milileters and 840 milileters had passed through the cake. It will be understood that these tests were repeated several times.

EXAMPLE 4

Tests were conducted to determine the capacity of ISX to remove heavy metals from aqueous solutions.

An aqueous solution containing 115 ppm of nickel was passed through a precoat cake one inch thick containing a mixture of 4.0 gms. of diatomite and 2.0 gms. of ISX at a flow rate of 1.5 gallons per minute. The concentration of nickel in the effluent was monitored. The capacity of ISX to absorb nickel was calculated to be 29.0 mg. in per gm. of ISX.

An aqueous solution containing 115 ppm of zinc was passed through a precoat cake one inck thick containing a mixture of 4.0 gms. of diatomite and 2.0 gms. of ISX at a flow rate of 1.5 gallons per minute. The concentration of zinc in the effluent was monitored. The capacity of ISX to absorb zinc was found to be 29.0 mg. of zinc per gm. of ISX.

Aqueous solutions containing 117 ppm of copper were passed through a precoat one inch thick containing a mixture of 4.0 gms. of diatomite and 2.0 gms. of ISX at flow rates of 2.0 gallons per minute, 2.5 and 3.0 gallons per minute. The concentration of copper in the effluent was monitored, and the capacity of ISX to absorb copper was found to be about 106 gms. of copper per gm. of ISX.

The results of these tests indicate that ISX is effective in removing all heavy metals from aqueous solutions but has a greater capacity for absorbing copper than it does for absorbing zinc and nickel.

While the present invention has been described in connection with particular embodiments thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed:

1. A process for recovering heavy metal from a continuous stream of water containing said metal in concentrations which vary from time to time between minimum and maximum levels, comprising
    causing said stream of water to flow through a filter element,
    coating said filter element with a mixture of diatomaceous earth and insoluble starch-xanthate, the relative amounts of diatomaceous earth and insoluble starch-xanthate combined in said mixture being in the range of 1.75 to 3.0 parts diatomaceous earth to one part insoluble starch-xanthate,
    continuously adding to said stream upstream of said filter element diatomaceous earth and insoluble starch-xanthate, the relative amounts of diatomaceous earth and insoluble starch-xanthate added to said stream being in the range of 1.75 to 3.0 parts diatomaceous earth to one part insoluble starch-xanthate, the amount of said insoluble starch-xanthate added to said stream upstream of said filter element being sufficient to react with all of said metal contained in said stream at said minimum concentration level to form upstream of said filter element a complex including all of the metal contained in said stream at said minimum concentration level, but said amount being insufficient to react with all of said metal in said stream at said maximum concentration level.

2. A process according to claim 1 where the amounts of diatomaceous earth and insoluble starch-xanthate in said mixture is in the range of about 1.75 to 2.0 parts diatomaceous earth to one part insoluble starch-xanthate.

3. A process according to claim 1 wherein said metal is copper.

4. A process according to claim 1 wherein said metal is nickel.

5. A process according to claim 1 wherein said metal is zinc.

* * * * *